US012719321B2

(12) United States Patent
Menhart et al.

(10) Patent No.: US 12,719,321 B2
(45) Date of Patent: Aug. 25, 2026

(54) STATOR OF AN ELECTRIC FLUX MACHINE, AND AXIAL FLUX MACHINE

(71) Applicant: Schaeffler Technologies AG & Co. KG, Herzogenaurach (DE)

(72) Inventors: Michael Menhart, Igling (DE); Stefan Riess, Kaufering (DE); Carsten Sonntag, Gauting-Königswiesen (DE); Andrä Carotta, München-Hadern (DE); Johann Oswald, Eschenlohe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 374 days.

(21) Appl. No.: 18/282,001

(22) PCT Filed: Apr. 8, 2022

(86) PCT No.: PCT/DE2022/100268
§ 371 (c)(1),
(2) Date: Sep. 14, 2023

(87) PCT Pub. No.: WO2022/214146
PCT Pub. Date: Oct. 13, 2022

(65) Prior Publication Data

US 2024/0146134 A1 May 2, 2024

(30) Foreign Application Priority Data

Apr. 10, 2021 (DE) ......................... 102021108954.9

(51) Int. Cl.
*H02K 3/24* (2006.01)
*H02K 1/14* (2006.01)
*H02K 21/24* (2006.01)

(52) U.S. Cl.
CPC ............... *H02K 3/24* (2013.01); *H02K 1/146* (2013.01); *H02K 21/24* (2013.01)

(58) Field of Classification Search
CPC .......... H02K 3/24; H02K 1/146; H02K 21/24; H02K 3/34; H02K 3/345; H02K 3/18; H02K 2213/03
(Continued)

(56) References Cited

U.S. PATENT DOCUMENTS

2007/0262662 A1* 11/2007 Dooley .................... H02K 3/24 310/201
2016/0315510 A1* 10/2016 Kawamata ............... H02K 3/18

FOREIGN PATENT DOCUMENTS

EP 0026099 4/1981
JP 2005304174 * 10/2005 ............... H02K 9/19
(Continued)

*Primary Examiner* — Ahmed Elnakib
(74) *Attorney, Agent, or Firm* — Volpe Koenig

(57) ABSTRACT

A stator of an electric axial flux machine as well as to an electric axial flux machine are provided. The stator of the axial flux machine includes multiple axially protruding stator teeth, a first winding being wound about at least one stator tooth, the first winding being spaced from the stator tooth by at least one radial spacing element such that a gap is formed between a radially inner face of the first winding and the stator tooth in order for a cooling fluid to be able to flow therethrough. The stator of an axial flux machine and the axial flux machine equipped with this stator afford durable units which ensure efficient cooling and thus high performance.

17 Claims, 4 Drawing Sheets

(58) Field of Classification Search
USPC .................................................... 310/65, 201
See application file for complete search history.

(56) References Cited

FOREIGN PATENT DOCUMENTS

| | | |
|---|---|---|
| WO | 2001011755 | 2/2001 |
| WO | 2020240173 | 12/2020 |

* cited by examiner 11
30
40
41
42
43
21

43
50
51
54
56
60
62
72

43
50
52
53
55
60
61
62
70
71
C

C-C:
21
52,61
72
71
60
50
72
50
60
70

21
101
54
52
111
72
50
110
60
72
54
100
80
61

STATOR OF AN ELECTRIC FLUX MACHINE, AND AXIAL FLUX MACHINE

CROSS-REFERENCE TO RELATED APPLICATIONS

This application is the U.S. National Phase of PCT Appln. No. PCT/DE2022/100268, filed Apr. 8, 2022, which claims priority from German Patent Application No. 10 2021 108 954.9, filed Apr. 10, 2021, the entire disclosures of which are incorporated by reference herein.

TECHNICAL FIELD

The disclosure relates to a stator of an electric axial flux machine as well as to an electric axial flux machine.

BACKGROUND

An electric drive train is known from the prior art. This consists of components for energy storage, energy conversion and energy transmission. The energy conversion components include electrical machines, for example axial flux machines. Axial flux machines are known from the prior art in various designs with one or more stators and one or more rotors.

An electrical axial flux machine, also referred to as a transverse flux machine, is a motor or generator in which the magnetic flux between a rotor and a stator is realized parallel to the axis of rotation of the rotor. Other names for electric axial flux machines are also brushless DC motors, permanently excited synchronous motors or disc motors.

Depending on the power range or intended application, it is often necessary to dissipate heat generated by various losses in electrical machines through effective cooling. The cooling ensures that critical temperatures, which could lead to damage to materials and components, are avoided. In addition, the cooling contributes to improving the efficiency of the electrical machine, since the ohmic resistance in electrical conductors in particular is highly temperature-dependent, which means that the power losses increase at higher temperatures.

The cooling of an electric rotary machine usually takes place largely in the stator. In the process, heat is dissipated from the wire coil to the surrounding housing or to the stator body itself and/or the surrounding air.

In the case of electrical machines in particular, which have a high torque or power density, surface cooling with heat dissipation to the surrounding air is often not sufficient, so that cooling with a cooling fluid is required. In principle, oils, water or water mixtures such as e.g. water-glycol, or dielectric liquids are also used.

However, the use of gaseous media, such as air, as a cooling medium is also not excluded.

There is usually also the requirement that the cooling system requires as little installation space as possible with little financial and technological effort and ensures optimum heat transfer.

A low axial installation space requirement is also often a central requirement criterion, regardless of the cooling implemented.

For high power densities, the winding of an electrical machine must have a high copper fill factor. This is usually realized by using solid winding wire conductors. This type of winding is also referred to as bar winding. The conductors are referred to as rods. Rods of substantially rectangular cross-section are often chosen.

A coil of a winding of an axial flux machine has a positive coil side and a negative coil side arranged circumferentially on the geometrically opposite side of a stator tooth, wherein both coil sides are positioned in grooves provided therefor, which form gaps between the stator teeth. The combination of several coils with a defined number of turns is referred to as the winding of an electrical machine. A defined voltage is induced on each coil side of a winding in the magnetic field.

Concentrated bar windings are known from the prior art. With this form of winding, one or more rods are guided around the stator tooth at least once without interruption, so that there is a voltage induction of the same sign on each side of the coil.

The electromagnetic coupling between the winding and iron of other components of the electrical machine results in changing forces on the winding during operation of the electrical machine, which increase the risk of wear or fatigue behavior.

If necessary, the windings are glued or clamped to the stator teeth and/or completely encapsulated with an epoxy resin.

In some known axial flux machines, the windings are implemented using a very large number of electrical conductors in the form of thin wires that wind around a number of stator teeth.

An electrical axial flux machine is known from WO 01/11755 A1, which has a stator on each side of a rotor. The stators, in turn, each have an annular yoke with grooves that extend radially from the inner side to the outer side, in which grooves multi-phase windings are guided.

Conventional electrical machines mostly transfer the heat from the winding via the stator to a coolant via thermal conduction or the heat to a moving air flow in the machine via convection.

Direct cooling is more efficient, in which the component in question is flushed directly with the cooling medium, often oil, in order to achieve direct and significantly higher heat dissipation.

In order to be able to absorb the forces on the electrical conductor resulting from the magnetic effects, the windings are often glued or clamped to the stator teeth.

Accordingly, heat can only be transferred to the environment from the outer side of the windings. In a special embodiment, it is provided that cooling channels, through which a cooling medium flows, are provided in a potting compound for fixing the windings, such as epoxy resin.

SUMMARY

Proceeding from this, the object of the present disclosure is to provide a stator of an axial flux machine and a durable axial flux machine equipped with said stator, which ensure efficient cooling and thus high performance.

This object is achieved by a stator of an axial flux machine and by an axial flux machine each having one or more of the features disclosed herein. Advantageous embodiments of the stator of an axial flux machine are listed below and in the claims.

The features disclosed herein can be combined in any technically useful manner, wherein the explanations from the following description as well as features from the figures can also be consulted for this purpose, which comprise supplementary embodiments according to the disclosure.

The disclosure relates to a stator of an axial flux machine with a plurality of axially protruding stator teeth, wherein a first winding is wound about at least one stator tooth. This first winding is spaced apart from the stator tooth by means of at least one radial spacing element, such that a gap is formed between a radial inner side of the first winding and the stator tooth in order for a cooling fluid to be able to flow therethrough.

In the context of the disclosure, a stator tooth is a projection that protrudes axially outwards from a stator yoke, which has an essentially two-dimensional configuration, and about which an electrical conductor is wound, such that the electrical conductor forms a coil whose longitudinal axis is essentially parallel to an axis of rotation of an axial flux machine equipped with the rotor.

In the context of the present description and the claims, the terms "radial", "axial" and "in the circumferential direction" relate to the winding about a stator tooth, unless explicitly stated otherwise.

The radial distance between the first winding and the stator tooth formed by the radial spacing element is between 0.3 mm and 0.7 mm, for example. In particular, the radial distance can be 0.5 mm to 0.6 mm.

This radial distance ensures that the components can be directly cooled or flushed with a coolant while at the same time having a small installation space.

This results in significantly shorter thermal paths with a comparatively low thermal resistance, as a result of which a high current density in the winding wire and thus a high power density, i.e., a high current-carrying capacity of the winding, can be achieved.

A respective winding arranged about a respective stator tooth can have rod-shaped longitudinal elements which run essentially radially in relation to an axis of rotation of an axial flux machine equipped with it.

Such rod-shaped longitudinal elements can also be referred to as rods.

In the usual configuration of the rotor, the axis of rotation of an axial-flux machine equipped with the rotor runs in the geometric center area or midpoint of the rotor.

A respective stator tooth comprises side surfaces aligned essentially perpendicular to the circumferential direction. In the case of the first winding, the rod-shaped longitudinal elements rest essentially on these side surfaces. Rod-shaped longitudinal elements of additional windings are aligned essentially parallel to these side surfaces. For example, such a side face can be designed to be essentially flat, so that rod-shaped longitudinal elements running parallel thereto are designed to be essentially linear.

In an advantageous embodiment it is provided that the cross section of a rod-shaped longitudinal element has a width B and a thickness D, where the following applies:

$$B/D>1.5.$$

For arranging a large number of turns in a winding, the ratio can also be:

$$B/D>2.$$

In an electrically advantageous embodiment, it is provided that the geometric dimension with the greater length, i.e., the width here, extends radially to the axially running longitudinal axis of the stator tooth.

In an alternative configuration, however, a round cross-section of the rod-shaped longitudinal element is also possible.

Either the entirety of several windings arranged on a stator tooth, i.e., the winding assembly, is made from a continuous wire or rod material, or at least one winding on the significant stator tooth is made from a continuous wire or rod material.

In a further advantageous embodiment it is provided that at least one axial spacing element is arranged between at least two rod-shaped longitudinal elements, so that a gap is formed between the rod-shaped longitudinal elements in order for a cooling fluid to flow therethrough.

Here, too, an axial distance, formed here between rod-shaped longitudinal elements of the same winding, can be between 0.3 mm and 0.7 mm and in particular between 0.5 mm and 0.6 mm.

The stator of the axial flux machine is designed with high performance and small axial overall length in particular when at least one stator tooth is wound with a first winding and this first winding is surrounded at least in regions on its radial outer side by at least one additional winding.

The respective winding comprises a plurality of turns, which are guided around the stator tooth with a substantially uniform pitch, and thus form a coil for each stator tooth.

The first winding is realized directly adjacent to the stator tooth, although according to the disclosure it should not be ruled out that another layer or another element is arranged between the first winding and the stator tooth, such as a lacquer or insulating material.

On its radial outer side, the circumference of the first winding is surrounded by the additional winding. There can be differences between the two windings with regard to the axial extents of the two windings.

The unit realized from the first winding and a respective additional winding is also referred to as a winding assembly.

In an advantageous embodiment of the stator, all of the stator teeth are provided with a first winding and with an additional winding that is wound around the respective first winding.

Furthermore, the disclosure does not rule out the possibility of a plurality of additional windings being arranged relative to a respective stator tooth, wherein all the windings are arranged radially nested within one another.

In this case, the windings arranged about a respective stator tooth can be electrically connected to one another in series.

Windings arranged directly adjacent to one another can be electrically connected to one another by means of a respective connecting section.

The windings arranged about a respective stator tooth can have the same pitch and/or the same winding direction.

The radially nested arrangement of several windings or coils opens up the possibility of a significantly increased voltage induction, or application of a voltage, and thus a higher degree of efficiency. This means that the axial flux machine equipped with the rotor according to the disclosure can be built relatively axially short, or can be operated with a higher voltage while the axial length remains the same. Due to the radially nested windings or coils, a highly concentrated coil arrangement can be implemented overall in an axial flux machine, with a number of coil sides that is necessary in particular for the no-load voltage in the so-called corner point.

In an advantageous embodiment, each winding or coil has a defined number of turns, realized by individual rods or rod-shaped longitudinal elements electrically connected in series, which are stacked axially and thus form a respective layer of line elements on each side of the stator tooth.

The coil or winding which is arranged radially further outward in this respect encloses the radially inner coil and comprises, in a further, enveloping layer, further rods or rod-shaped longitudinal elements connected in series. Each enveloping coil can have a different number of coil sides or rod-shaped longitudinal elements on one coil side.

In the case of a nested arrangement of the windings, at least one distancing element can be arranged radially between windings which are arranged directly adjacent to one another, so that a gap is formed between these windings for a cooling fluid to be able to flow through them.

Here, the distance, this time formed between rod-shaped longitudinal elements of a plurality of windings, for example, can also be between 0.3 mm and 0.7 mm and in particular between 0.5 mm and 0.6 mm.

Furthermore, the stator of the axial flux machine is advantageously designed if at least two of the rod-shaped longitudinal elements of at least one winding are fixed to one another.

Alternatively or additionally, at least two of the rod-shaped longitudinal elements of windings arranged directly adjacent to one another can be fixed to one another.

As a result, the winding or its turns can be fixed and stiffened. In this way, alternating forces and thermo-mechanical stresses generated from the electromagnetic coupling between the winding and the iron of other components of the electrical machine in the alternating field of the electrical machine can be distributed and thus more easily tolerated by the windings or turns.

For fixation, it is possible to connect the rods of the winding or several windings by gluing them together so that a coherent segment is created.

The rod-shaped longitudinal elements can also be fixed via gluing, encapsulating and/or a baked lacquer that adheres under heat, essentially at points or over a large area.

At least one of the axial spacing elements, radial spacing elements and/or distancing elements can also be used to fix the rod-shaped longitudinal elements to one another, in which case the axial spacing elements, radial spacing elements and/or distancing elements can be used to completely or supportively fix the windings.

In the case of several windings arranged radially nested in one another on a stator tooth, several or all of the windings arranged on this stator tooth can be designed according to the disclosure and/or connected to one another.

It can be provided the size of a contact surface formed by the radial spacing element on the first winding is at most 1/20 of that of the first winding relative to the inner surface formed by the stator tooth.

The stator according to the disclosure ensures direct cooling of the winding or windings via spacing elements or distancing elements to create gaps and spaces in a winding or between a winding and adjacent components. A cooling medium can flow through these gaps or spaces, wherein the distance between at least one element to be cooled and an opposite boundary of a respective flow channel is sufficiently large so that sufficient cooling medium can be conducted through the flow channel per unit of time and heat from power-carrying components can be directly transferred to the cooling medium and removed from it by means of convection.

Overall, the spacing elements or distancing elements ensure that the number and/or size of the surfaces of power-carrying components that can be contacted by the cooling medium is greatly increased compared to conventional axial flux machines, so that the cooling can take place very effectively.

A further aspect of the present disclosure is an axial flux machine which has at least one stator according to the disclosure. The axial flux machine according to the disclosure can have a stator, which is designed according to the present disclosure, on both axial sides of a rotor.

BRIEF DESCRIPTION OF THE DRAWINGS

The disclosure described above is explained in detail below against the pertinent technical background with reference to the accompanying drawings, which show preferred embodiments. The disclosure is not limited in any way by the purely schematic drawings, wherein it should be noted that the embodiments shown in the drawings are not limited to the dimensions shown. In the drawings.

DETAILED DESCRIPTION

First, the general structure of an axial flux machine 1 is explained with reference to FIGS. 1 and 2.

Figures 1, 2:
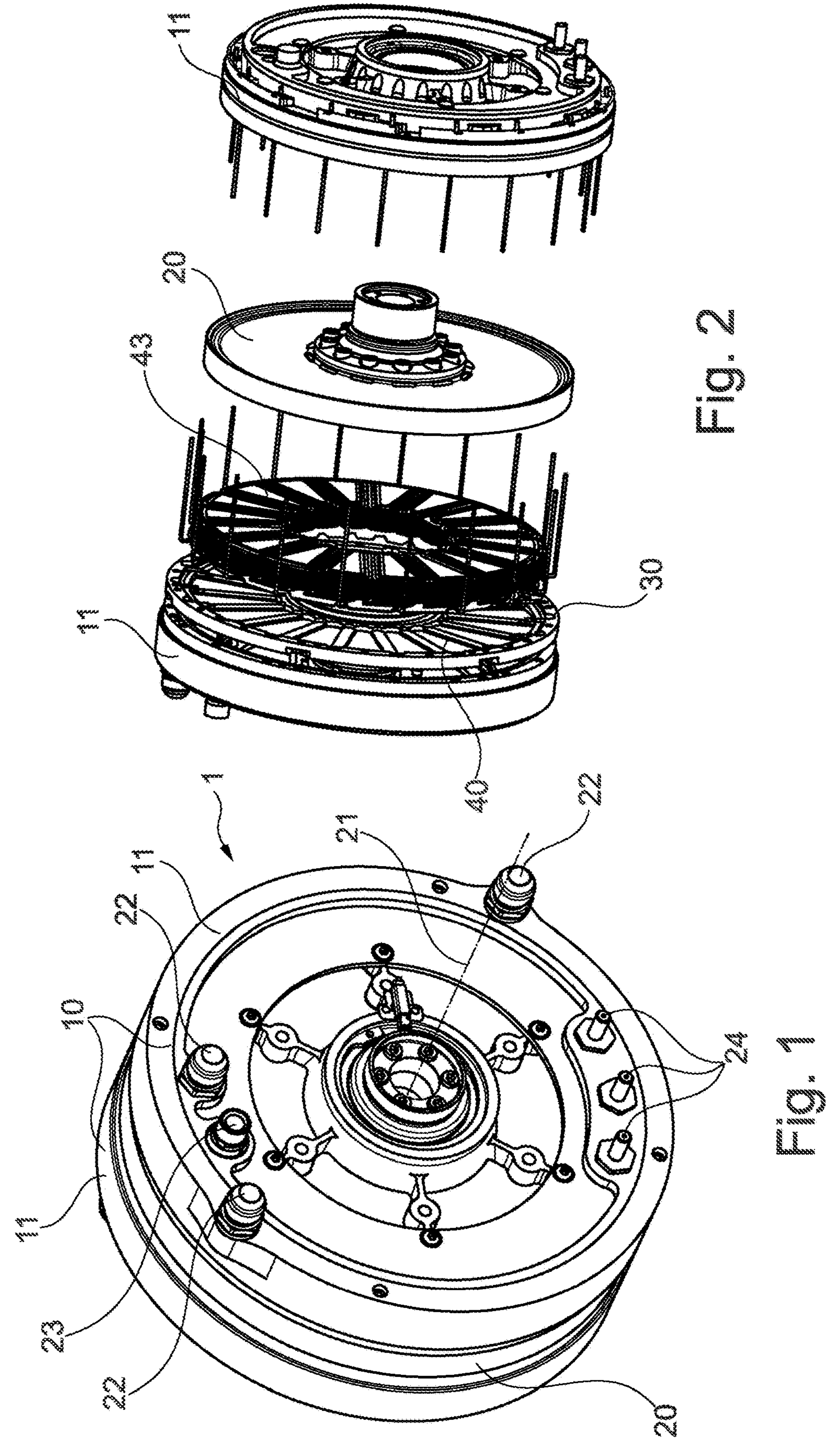
FIG. 1: shows an axial flux machine in a perspective view.
FIG. 2: shows an axial flux machine in an exploded view.

The axial flux machine 1 shown in FIGS. 1 and 2 comprises, in the embodiment shown here, two stator halves 11 forming the stator 10, between which the rotor 20, which is rotatable about an axis of rotation 21 relative to the stator halves 11, is arranged axially.

In the embodiment shown here, a plurality of coolant connections 22 and a plug-in connection 23 for a control-related connection and a plurality of phase connections 24 are arranged on at least one stator half 11.

As can be seen from the exploded view in FIG. 2, each stator half 11 includes a so-called stator yoke 30, which can also be referred to as a stator core. Stator teeth 40 arranged essentially in a star shape extend in the axial direction from this stator yoke 30.

As can also be seen from the exploded view in FIG. 2, each stator half 11 also has a number of winding assemblies 43 corresponding to the number of stator teeth 40. A winding assembly 43 is assigned to each stator tooth 40. Only the first connections 56 of these winding assemblies 43 can be seen on the stator half 11 shown on the right in FIG. 2.

These first connections 56, which run essentially parallel to the axis of rotation of the axial flux machine, connect axially opposite winding assemblies 43 to one another.

Figures 3, 4, 5:
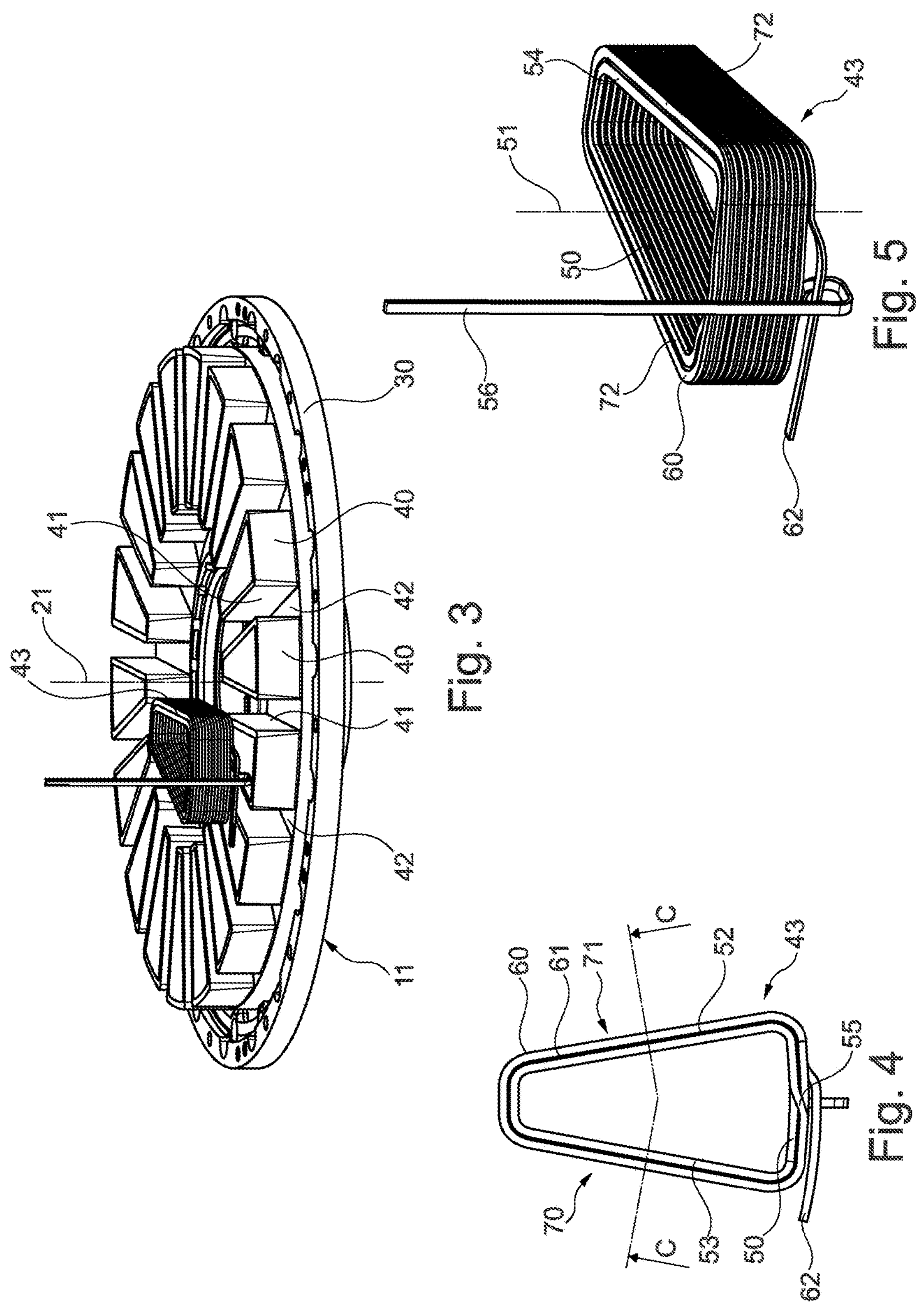
FIG. 3: shows a stator of the axial flux machine in a perspective view.
FIG. 4: shows a winding assembly in plan view.
FIG. 5: shows the winding assembly in a perspective view.
Figures 6, 7:
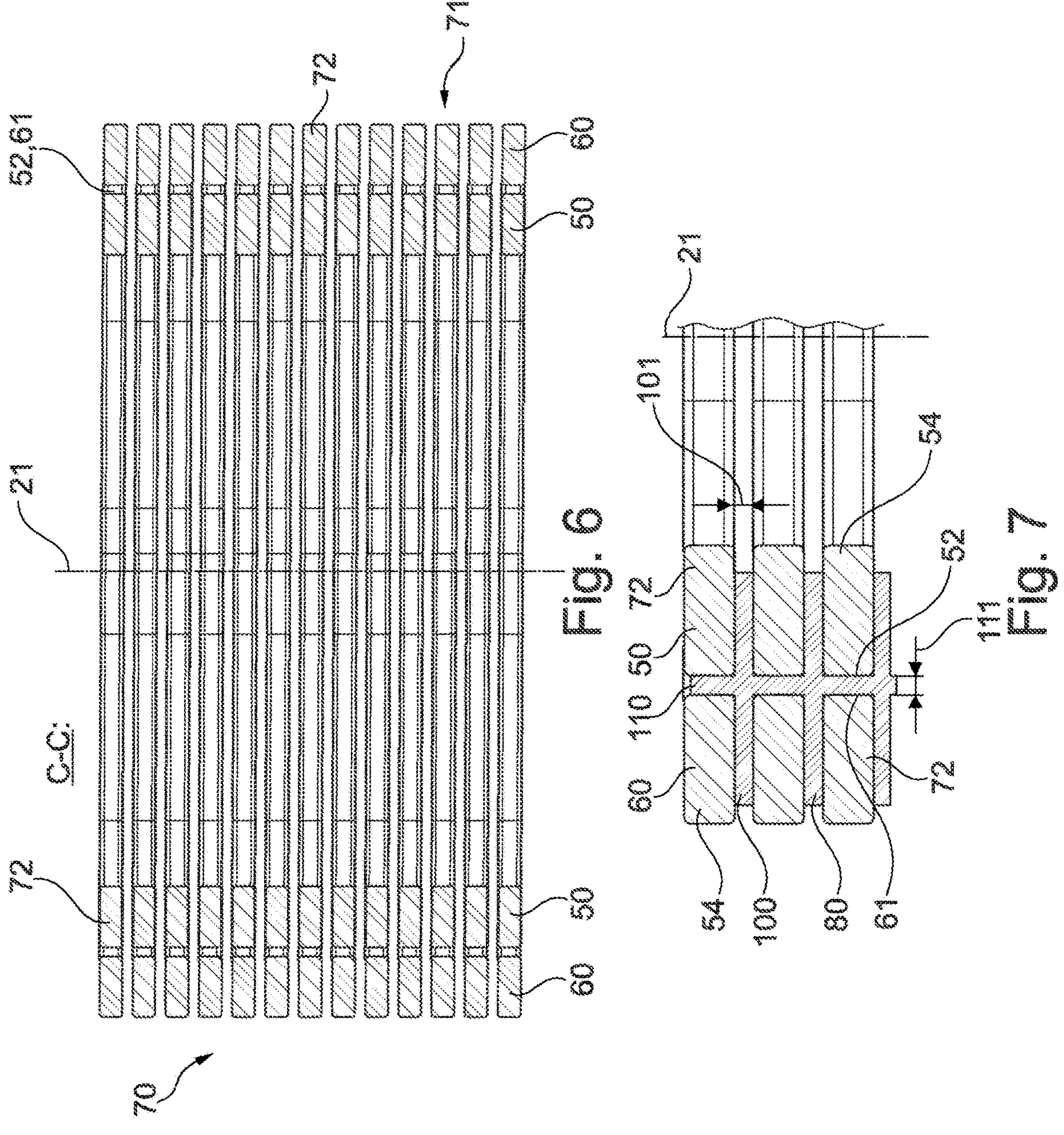
FIG. 6: shows the winding assembly in a sectional view along the section line CC shown in FIG. 4, FIG. 7: shows an enlarged section from FIG. 6, FIG. 8: shows a sectional view of a stator tooth with a winding assembly arranged thereon.

FIG. 3 shows the stator yoke 30 of a stator half 11 in a perspective view. The axially protruding stator teeth 40 are clearly visible here. Grooves 42 are formed between side surfaces 41 of a respective stator tooth 40. These grooves 42 serve to accommodate rod-shaped longitudinal elements 72, as illustrated in FIG. 6, of a respective winding assembly 43, as is also shown by way of example in FIG. 3.

Such a winding assembly 43 is shown in FIGS. 4 and 5 in different views.

The winding assembly 43 comprises a first winding, which can also be referred to as a first coil. The first winding 50 is radially surrounded by an additional winding 60. Individual turns 54 of both windings 50, 60 have the same pitch and/or the same winding direction.

The first winding 50 includes a first connection 56 for making electrical contact, and the additional winding 60 includes a second connection 62 for making electrical contact with the winding assembly 43. Between the two windings 50, 60 there is a connecting section 55 for the electrical connection of the two windings 50, 60 to one another.

Looking at FIGS. 3 and 5 together, it can be seen that the longitudinal axis 51 of the first winding 50 runs parallel to the axis of rotation 21 of the axial flux machine.

A respective winding 50, 60 includes a plurality of turns 54, the components of which are the rod-shaped longitudinal elements 72, which are to be placed in the grooves 42.

FIG. 6 shows the winding assembly 43 along the section line CC indicated in FIG. 4, where the layered arrangement of the two windings 50, 60 is clearly visible. It can be seen that the radial outer side 52 of the first winding 50 essentially corresponds to the radial inner side 61 of the additional winding 60, or rests against it, or is at a small distance from it. The winding assembly 43 and also their individual windings 50, 60 form a first coil side 70 and a second coil side 71, wherein each coil side 70, 71 runs in its own groove 42.

Figure 9:
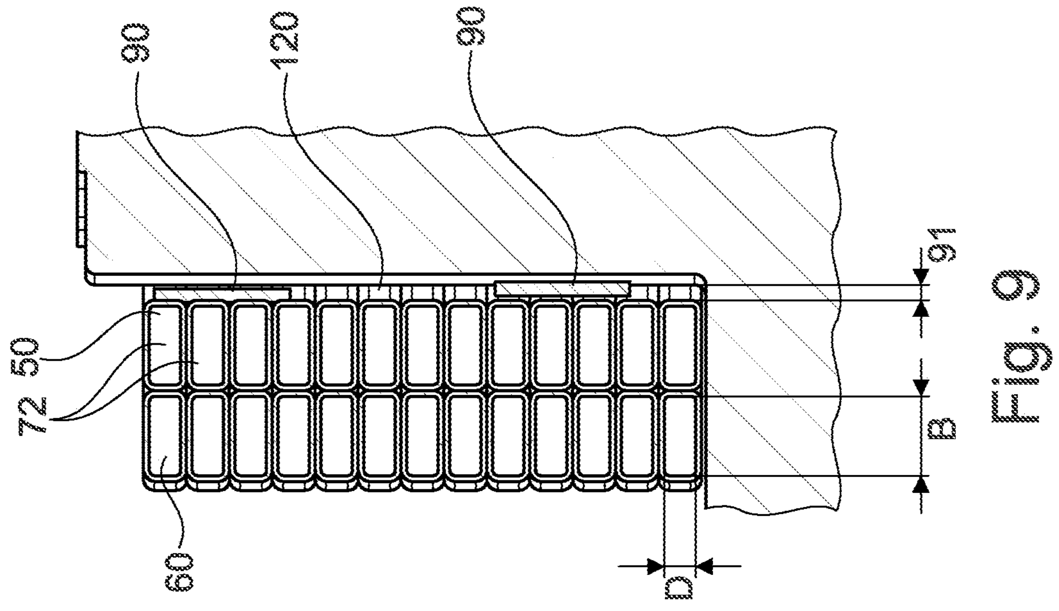
FIG. 9: shows an enlarged section from FIG. 8.

It can be seen from FIG. 9 that the width B of a respective rod-shaped longitudinal element 72 is significantly greater than its thickness D.

This geometric design and the radial nesting of the two windings 50, 60 allow a large number of rod-shaped longitudinal elements 72 to be arranged for each stator tooth in a very short axial space, so that a comparatively high voltage is applied to the windings 50, 60 and thus to the stator, or can be induced here.

FIG. 7 shows that the individual turns 54 of the windings 50, 60 can be fixed to one another by means of one or more fixings 80. The windings 50, 60 arranged directly adjacent to one another or their turns 54 can be fixed to one another, for example by means of gluing. This fixing 80 in the radial direction also causes the formation of a distancing element 110 for forming a radial distance 111 between the two windings 50, 60. The distancing element 110 can be formed partially between the two windings 50, 60, so that there is at least one gap between the two windings 50, 60 through which a coolant can flow in order to cool the turns 54.

In addition, the fixing 80 between individual turns 54 of the two windings 50, 60 also forms axial spacing elements 100, which each form an axial distance 101 between the turns 54. A respective axial spacing element 100 can also be formed only partially between the turns 54 in order to leave gaps or hollow spaces free here as well, through which a coolant can flow in order to cool the turns 54.

The fixing 80 ensures that the windings 50, 60 or their turns 54 withstand the acting electromagnetic forces in a sufficient manner.

Figure 8:
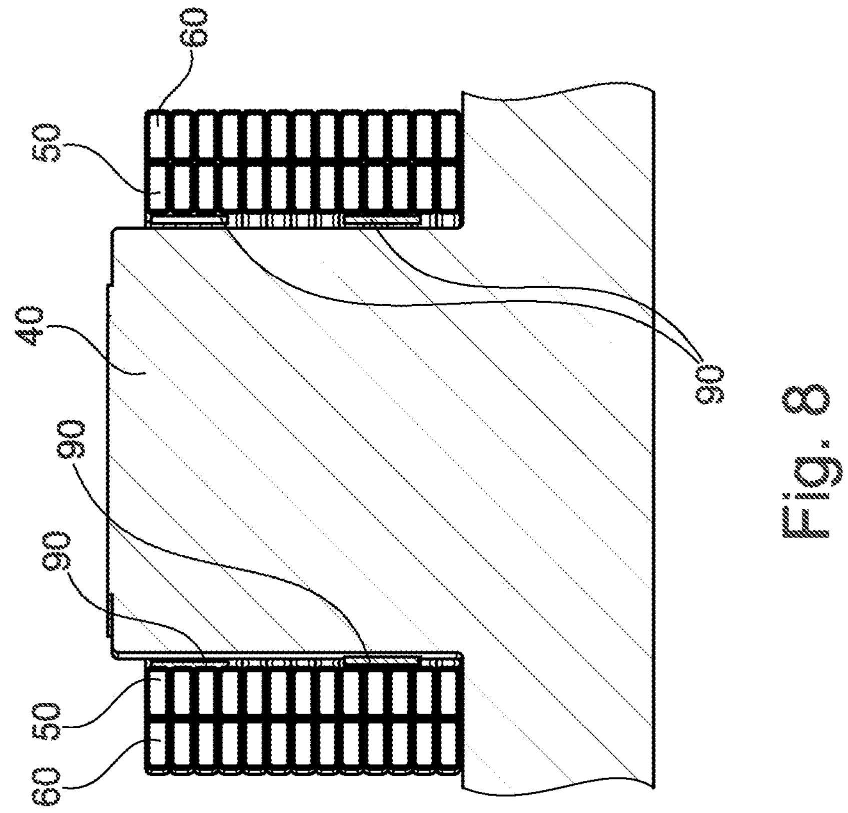

FIGS. 8 and 9 show the winding assembly 43 on the stator tooth 40 in a sectional view. Here it can be seen that between the radial inner side 53 or the inner surface 57 of the first winding 50 and the outer side of the stator tooth 40, a plurality of essentially punctiform radial spacing elements 90 are arranged. A radial distance 91 between the first winding 50 and the stator tooth 40 is formed by these radial spacing elements 90.

As a result, a gap 120 is formed between the stator tooth 40 and the first winding 50, through which a coolant can flow, in order to thus dissipate heat from the first winding 50 via convection.

With the stator of an axial flux machine proposed here and with the axial flux machine equipped with the stator, long-lasting units are made available that ensure efficient cooling and thus high performance.

LIST OF REFERENCE SYMBOLS

1 Axial flux machine
10 Stator
11 Stator half
20 Rotor
21 Axis of rotation
22 Coolant connection
23 Plug-in connection
24 Phase connection
30 Stator yoke
40 Stator tooth
41 Side face
42 Groove
43 Winding assembly
50 First winding
51 Longitudinal axis
52 Radial outer side of the first winding
53 Radial inner side of the first winding
54 Turn
55 Connecting portion
56 First connection
57 Inner surface
60 Additional winding
61 Radial inner side of additional winding
62 Second connection
70 First coil side
71 Second coil side
72 Rod-shaped longitudinal element
80 Fixing
90 Radial spacing element
91 Radial distance
100 Axial spacing element
101 Axial distance
110 Distancing element
111 Distance
120 Clearance
B Width
D Thickness

The invention claimed is:

1. A stator of an axial flux machine, the stator comprising:

a plurality of axially protruding stator teeth;

a first winding wound about at least one of the stator teeth; and, at least one radial spacing element, said first winding being spaced apart from said one of the stator teeth by the at least one radial spacing element such that a gap is formed between a radial inner side of the first winding and the stator tooth which is adapted for a cooling fluid to flow therethrough;

wherein there are a plurality of the first windings, and respective ones of the first windings are arranged about respective ones of the stator teeth, each said first winding has rod-shaped longitudinal elements which run essentially radially in relation to an axis of rotation of the axial flux machine equipped with a rotor; and wherein the stator further comprises at least one axial spacing element arranged between at least two rod-shaped longitudinal elements, so that a gap is formed between the rod-shaped longitudinal elements that is adapted for the cooling fluid to flow therethrough.

2. The stator according to claim 1, wherein a cross section of the rod-shaped longitudinal element has a width B and a thickness D, having a relationship defined by: B/D>1.5.

3. The stator according to claim 1, wherein at least one of the stator teeth is wound with the first winding, and the first winding is surrounded at least in regions on a radial outer side thereof by at least one additional winding.

4. The stator according to claim 3, further comprising at least one distancing element arranged radially between the first winding and the at least one additional winding that are arranged directly adjacent to one another, so that a gap is formed between the first winding and the at least one additional winding that is adapted for the cooling fluid to flow therethrough.

5. The stator according to claim 3, wherein there are a plurality of the first windings, and respective ones of the first windings are arranged about respective ones of the stator teeth, each said first winding has rod-shaped longitudinal elements which run essentially radially in relation to an axis of rotation, the at least one additional winding also including rod-shaped longitudinal elements, and at least two of the rod-shaped longitudinal elements of the first winding and the at least one additional winding arranged directly adjacent to one another are fixed to one another.

6. The stator of according to claim 1, wherein at least two of the rod-shaped longitudinal elements of at least one of the first windings are fixed to one another.

7. The stator according to claim 1, wherein a size of a contact surface formed by the radial spacing element on the first winding is at most 1/20 of that of the first winding relative to an inner surface formed by the stator tooth.

8. An axial flux machine, comprising at least one of the stators according to claim 1.

9. A stator of an axial flux machine, the stator comprising:

a plurality of axially protruding stator teeth;

a plurality of first windings, each wound about a respective one of the stator teeth;

a respective radial spacing element between each said first winding and the respective one of the stator teeth to form a gap between a radial inner side of the first winding and the respective one of the stator teeth which is adapted for a cooling fluid to flow therethrough;

a plurality of additional windings that each surround, at least in regions, a radial outer side of each respective one of the first windings; and at least one distancing element arranged radially between each of the first windings and the additional windings that are arranged directly adjacent to one another, so that respective gaps are formed between the first windings and the additional windings that are adapted for the cooling fluid to flow therethrough.

10. The stator according to claim 9, wherein each said first winding has rod-shaped longitudinal elements which run essentially radially in relation to a rotation axis of a rotor to be received in the stator.

11. The stator according to claim 10, wherein a cross section of the rod-shaped longitudinal element has a width B and a thickness D, having a relationship defined by: B/D>1.5.

12. The stator according to claim 10, wherein the stator further comprises at least one axial spacing element arranged between at least two rod-shaped longitudinal elements, so that a gap is formed between the at least two rod-shaped longitudinal elements that is adapted for the cooling fluid to flow therethrough.

13. The stator of according to claim 10, wherein at least two of the rod-shaped longitudinal elements of at least one of the first windings are fixed to one another.

14. The stator according to claim 9, wherein the at least one additional winding includes rod-shaped longitudinal elements, and at least two of the rod-shaped longitudinal elements of the first winding and the at least one additional winding arranged directly adjacent to one another are fixed to one another.

15. The stator according to claim 9, wherein a size of a contact surface formed by the radial spacing element on the first winding is at most 1/20 of that of the first winding relative to an inner surface formed by the stator tooth.

16. An axial flux machine, comprising at least one of the stators according to claim 9.

17. A stator of an axial flux machine, the stator comprising:

a plurality of axially protruding stator teeth;

a first winding wound about at least one of the stator teeth; and, at least one radial spacing element, said first winding being spaced apart from said one of the stator teeth by the at least one radial spacing element such that a gap is formed between a radial inner side of the first winding and the stator tooth which is adapted for a cooling fluid to flow therethrough;

wherein at least one of the stator teeth is wound with the first winding, and the first winding is surrounded at least in regions on a radial outer side thereof by at least one additional winding; and wherein the stator further comprises at least one distancing element arranged radially between the first winding and the at least one additional winding that are arranged directly adjacent to one another, so that a gap is formed between the first winding and the at least one additional winding that is adapted for the cooling fluid to flow therethrough.

* * * * *